United States Patent Office 3,606,176
Patented Sept. 20, 1971

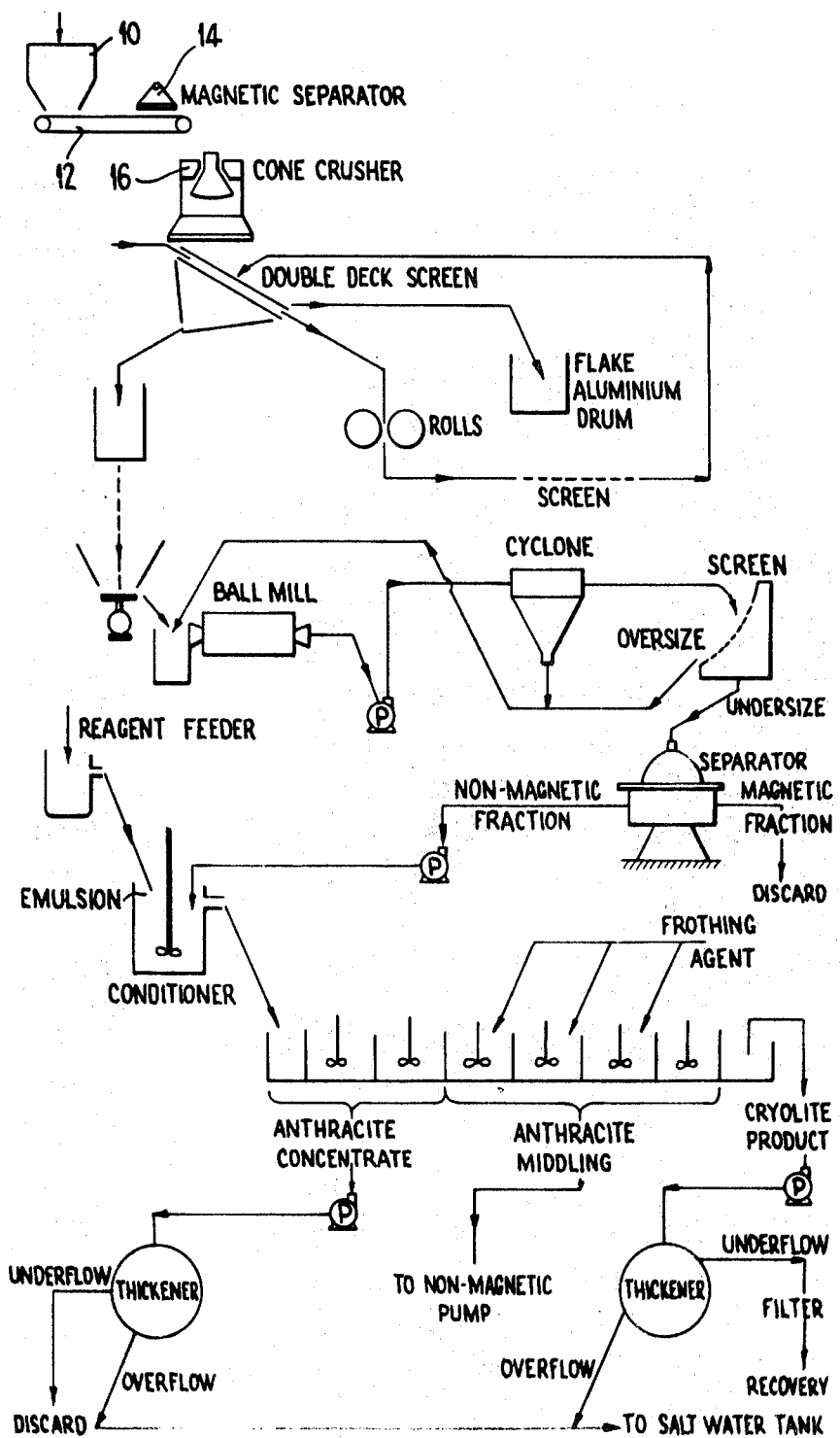

3,606,176
SEPARATION OF REDUCTION BATH MATERIALS FROM CARBONACEOUS RESIDUES
Peter Anthony Vodic, Brighton, South Australia, Australia, assignor to Comalco Aluminium (Bell Bay) Limited, Bell Bay, Tasmania, Australia
Filed June 27, 1969, Ser. No. 837,017
Claims priority, application Australia, July 1, 1968, 39,959/68
Int. Cl. B02c 1/00, 11/08, 21/00
U.S. Cl. 241—20                    5 Claims

ABSTRACT OF THE DISCLOSURE

The invention relates to the recovery of reuseable constituents from the spent cathodes from electrolytic furnaces used in the reduction of aluminum, which furnaces require to be shut down from time to time for maintenance or other purposes, at which stage they contain a spent cathode consisting of carbonaceous residues from the anode, metallic aluminum and cryolite. The constituents are recovered by crushing the spent cathode to reduce particle size and to form aluminum particles into flake aluminum; screening to remove flake aluminum and to separate the larger and smaller particles of the remaining constituents; putting the particulate material through a ball mill in the form a slurry with salt water to prevent undue leaching; and separating the constituents of the ground particulate material by flotation.

---

This invention relates to the separation of reduction bath materials from carbonaceous residues and its main application is to the separation of carbonaceous materials from cryolite and other constituents of the spent cathodes of electrolytic furnaces used in the reduction of aluminium.

The electrodes of electrolytic reduction furnaces in general consist of an anode, usually a carbonaceous block, pre-formed or formed in situ and gradually fed downwards as it is consumed, and a cathode which is pre-formed or formed in situ, and must be renewed from time to time. The cathode is made up by lining the steel shell of the furnace with a layer of alumina or other insulating material, then ramming a carbon pitch mixture onto this to form a monolithic carbon base. In some cases the carbon pitch mixture may be replaced in whole or in part by pre-formed carbon blocks.

In service the cathode basin contains the molten aluminium and a layer of cryolite flux and other additives constituting the electrolyte. Due to deterioraion in the cathode carbon lining, the materials present in the flux, particularly sodium compounds, gradually penetrate the carbon lining and eventually necessitate closure of the furnace and reconstruction of the cathode with new materials. According to present practice, the spent cathode is dumped and no attempt is made to recover any of its constituents. There are available chemical engineering processes for the recovering of valuable constituents from spent cathodes but the equipment is very expensive and can only be justified in the case of extremely large plants or where there a number of large plants in the same area which can make use of common recovery facilities.

In one specific reduction furnace, the weight of a spent cathode is approximately 30 tons with an approximate composition of 30% carbon, 25% alumina, 20% cryolite, and 5% aluminium metal. Other constituents may include the fluorides of sodium, aluminium, calcium, and lithium and other commonly occurring materials within the reduction process. The life of the cathode is influenced by the operating conditions in the cell and by a number of other factors, and break down can occur over a wide range of ages, but commonly of the order of 1,000 days.

In one installation operated by the applicant company there are upwards of one hundred cathode failures per annum, from which it will be clear that a considerable quantity of raw and partially processed material is dumped every year. It is also clear that it would be of considerable economic value to be able to recover re-usable constituents of the spent cathodes.

While, as indicated above, the invention has its main application to the recovery of re-usable materials from the spent cathodes of electrolytic furnaces, there are other means by which carbons and reduction bath materials can come into admixture. For example, carbon is frequently shed from the anodes and floats on the surface of the bath. This is removed by raking and it naturally follows that some of the bath constituents are removed at the same time.

Again, the anodes of an electrolytic furnace are in contact with the bath during operation. This results in some of the bath materials adhering to spent pre-baked anodes when they are removed for replacement. The invention is equally applicable to the separation of carbonaceous materials from other constituents in these cases and in any other similar cases, but for the sake of convenience we will hereinafter refer to the recovery of re-usable constituents from spent cathodes of electrolytic furnaces it being understood that where the term "spent cathode" is used reference is, where the context allows, intended also to similar mixtures.

Accordingly it is an object of this invention to provide a method of and apparatus for the recovery of cryolite and other re-usable constituents of the "spent cathdes" of electrolytic furnaces used in the reduction of alumina to aluminium.

In one of its aspects the invention resides in a method of recovering cryolite and other valuable constituents from the "spent cathode" (as hereinbefore defined) of an electrolytic furnace used in the reduction of alumina to aluminium, said method comprising the steps of:

comminuting the "spent cathode" to particle size,
feeding the particles to flotation apparatus,
removing carbon particles by flotation from the flotation apparatus, and
discharging cryolite and other constituents from the bottom of the flotation apparatus.

The carbon constituent (usually in the form of anthracite) is thus separated out from the remainder of the "spent cathode." The separated constituents including alumina, cryolite, aluminium metal, and other valuables can be re-used in the subsequent operation and reconstruction of the electrolytic furnaces.

Preferably comminution of the "spent cathode" is achieved by means of crushing or grinding, and a screening step prior to feed of the particles to the flotation apparatus returns oversize particles to the crushing and/or grinding apparatus. A magnetic separator may be placed in the crushing or grinding circuit.

In another of its aspects, the invention resides in apparatus for the recovery of cryolite and other valuable constituents from the "spent cathode" of an electrolytic furnace used in the reduction of alumina to aluminium, said apparatus comprising:

crushing and/or grinding means to reduce said cathode to a predetermined particle size,
flotation apparatus adapted to remove carbon particles by flotation and to discharge cryolite and other constituents from the bottom thereof, and
means to feed the particles from the crushing and/or grinding apparatus to the flotation apparatus.

In order that the invention may be more readily understood it will now be described by way of example with reference to the accompanying drawing which is a diagrammatic representation of one form of apparatus suitable for carrying out the process of the invention.

The spent cathode is delivered to a hopper 10, from which it travels along a conveyor 12, past a magnetic separator 14 to a cone crusher 16. The discharge from the cone crusher drops into a double deck screen of which the upper deck is formed of 1" mesh and the lower deck is formed of ¼" mesh. Substantially all of the material leaving the cone crusher, with the exception of flake aluminium, is sufficiently small to pass through the 1" mesh of the upper deck.

The flake aluminium is delivered from the upper deck into a drum.

The material passing through the upper deck but failing to pass through the lower deck is further crushed in a pair of rollers and returned to the double deck screen. Material passing through the lower deck is delivered, via a hopper and disc feeder, to a ball mill wherein salt water is added to the crushed material and the particle size is further reduced.

Salt water, or more accurately water containing sodium ion, is used because there are considerable constituents of sodium salts in the spend cathodes and excessive leaching would occur if fresh water were used.

Regardless of the initial source of water, the water is recirculated in a closed circuit so that, after initial leaching out of some of the sodium salts, the water becomes saturated with the sodium ion and no further harmful effect on the process recoveries is incurred.

The slurry discharged from the ball mill is delivered by a pump to a cyclone which performs a classifying action, the smaller particles passing out through the tangential upper outlet and the larger particles passing out through the axial lower outlet.

The cyclone underflow is collected and returned to the ball mill for further sub-division, while the cyclone overflow is fed to a sieve bend. The apertures of the sieve bend permit only particles of a size smaller than 35-mesh Tyler to pass through, the screen oversize being returned with the cyclone underflow to the ball mill.

The crushing and grinding steps are controlled, particularly as to time, so that approximately 50% by weight of the particles leaving the ball mill pass 325-mesh Tyler. This is found to achieve maximum economy by avoiding the opposite extremes of excessive recirculation on the one hand and interference with the grinding action by the presence of excessive fines on the other hand.

The screen undersize is fed to a wet magnetic separator and thence to flotation cells via a conditioning tank in which an emulsifier is added at the rate of 10 ml./lb. of feed material, the emulsifier consisting, for example, of 96% by volume of water, 1.0% by volume of kerosene, 1% by volume of Shell drill oil and 1% by volume of Triton X–100.

In the conditioning tank the slurry is subjected to violent agitation, the overflow being fed to the flotation cells.

The overflow pulp from the conditioning tank is fed to flotation apparatus which, in the illustrated embodiment, is provided with six cells, each of which respresents a flotation stage.

In the first stage cell an addition of a commercial frothing agent such as cresylic acid or "Aerofroth" 65 is made with further additions to subsequent stages as is necessary to maintain efficient flotation conditions, the total addition being at the rate of approximately 0.6 ml./lb. of feed material.

Separation of the bulk of the carbon fraction of the spent cathode is achieved by flotation in the first two cells, the overflow product from cells 3 to 6 being recirculated through the conditioning tank to achieve relatively complete separation of the remainder of the carbon fraction.

Substantially all of the carbon is floated out of the pulp by this means and fed to a settling tank for final separation and drying. The remainder of the constituents of the spent cathode reach the final stage cell and are removed as tailings from the bottom of that cell. Keeping the particle size entering the flotation cells to a maximum of +65-mesh Tyler ensures that very little, if any, carbon particles will be left in the discharge from the bottom of the final flotation cell.

The cryolite tailings from the bottom of the final flotation cell is fed to a thickener wherein it is allowed to settle, fluid being removed from the top and the thickened slurry being removed from the bottom and fed through a magnetic separator to a filter in which substantially all of the remaining liquid is removed. The cryolite, alumina and aluminium metal and other valuables are removed from the filter in the form of a filter cake, dried, and stored, either for return to a furnace after it has been reconditioned, or for feed to another furnace. The carbon fraction after settling and drying, is available for use in the reconstruction of a furnace or may be applied to any other useful purpose for which it is suited.

Thus, by the application of the method and apparatus of the invention, substantially all of the carbon is removed from a "spent cathode," leaving the other valuable constituents in a condition in which they can be recovered and re-used.

I claim:

1. A method of recovering cryolite and other constituents from an aluminum-containing spent cathode from an electrolytic reduction of alumina to aluminum using an electrolyte containing cryolite, said method comprising the steps of:
    comminuting the spent cathode to particle size in which step flake aluminum is formed from aluminum particles present in the material;
    removing flake aluminum from the comminuted material by screening; and
    subjecting a pulp of the screened particles to a flotation step wherein carbon particles are flotatively separated from a pulp tailing containing cryolite.

2. The method defined in claim 1, wherein part of the comminuting step is performed by grinding in a ball mill, water containing sodium ions being added to the material in the ball mill to form a slurry.

3. The method defined in claim 2, wherein the ground slurry is conditioned by adding thereto an emulsifier before the slurry is subjected to the flotation step.

4. The method defined in claim 1, including the step of adding a frothing agent to at least a part of the ground slurry subjected to flotation.

5. A method as claimed in claim 1, in which substantially all particles of the ground slurry subjected to flotation have sizes not larger than 65-mesh Tyler.

References Cited

UNITED STATES PATENTS

| | | | |
|---|---|---|---|
| 3,300,147 | 1/1967 | Johnson | 241—20 |
| 3,383,057 | 5/1968 | Jepsen | 241—20 |
| 3,503,560 | 3/1970 | Condolios | 241—20 |
| 3,502,271 | 3/1970 | Hays | 241—24 |
| 3,446,443 | 5/1969 | Clark et al. | 241—20 |

JAMES L. JONES, Jr., Primary Examiner

U.S. Cl. X.R.

241—24